United States Patent
Thomas et al.

(10) Patent No.: US 9,959,071 B2
(45) Date of Patent: May 1, 2018

(54) METHOD AND SYSTEM FOR MANAGING DATA IN NON-VOLATILE MEMORY

(71) Applicant: SanDisk Technologies Inc., Plano, TX (US)

(72) Inventors: Nicholas James Thomas, Dundee (GB); Joseph Meza, Aliso Viejo, CA (US)

(73) Assignee: SanDisk Technologies LLC, Plano, TX (US)

( * ) Notice: Subject to any disclaimer, the term of this patent is extended or adjusted under 35 U.S.C. 154(b) by 79 days.

(21) Appl. No.: 15/087,104

(22) Filed: Mar. 31, 2016

(65) Prior Publication Data

US 2017/0285948 A1    Oct. 5, 2017

(51) Int. Cl.
G06F 12/02    (2006.01)
G06F 3/06    (2006.01)

(52) U.S. Cl.
CPC ............ *G06F 3/064* (2013.01); *G06F 3/0604* (2013.01); *G06F 3/0647* (2013.01); *G06F 3/0679* (2013.01)

(58) Field of Classification Search
CPC ...... G06F 3/0604; G06F 3/064; G06F 3/0647; G06F 3/0679
See application file for complete search history.

(56) References Cited

U.S. PATENT DOCUMENTS

| | | |
|---|---|---|
| 8,239,639 B2 | 8/2012 | Sinclair |
| 8,261,009 B2 | 9/2012 | Freikorn |
| 2012/0297122 A1 | 11/2012 | Gorobets et al. |
| 2013/0061019 A1 | 3/2013 | Fitzpatrick et al. |

*Primary Examiner* — Yong Choe
(74) *Attorney, Agent, or Firm* — Brinks Gilson & Lione

(57) ABSTRACT

Methods and systems for managing data storage in a non-volatile memory system are disclosed. The method may include receiving data, determining a data classification for the received data from a predetermined plurality of data classifications, writing the received data to an open block having only data of a same data classification as the determined data classification and, upon completely programming the open block, associating an epoch indicator where the epoch indicator defines a time period within which the block was created. When a block reclaim trigger is detected, only data within a same data classification and epoch may be reclaimed. An incrementing epoch indicator identifies a predetermined time granularity and is assigned to data such that earlier data and newer data are distinguishable. A system to implement the method may include a non-volatile memory and a controller configured to track and apply epoch and data-type classification information for data.

19 Claims, 9 Drawing Sheets

US 9,959,071 B2

METHOD AND SYSTEM FOR MANAGING DATA IN NON-VOLATILE MEMORY

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Flash memory is often made up of groups of memory cells referred to as pages, and multiple pages are often then organized in groups known as blocks. Flash memory cells may be physically configured to store data in different bit per cell levels.

After data is written to a block in memory, some of that data may become obsolete over time when updated versions of that data are later written by a host to other blocks in the non-volatile memory, or when the host expressly identifies certain data is now obsolete. At specified intervals, or in response to certain criteria being met, a memory system may perform maintenance operations, such as garbage collection operations, to identify a block with valid and obsolete data and move the valid data remaining in the identified block to another block. The originally identified block may then be recycled for use by the memory system. Typically, data with different characteristics is written from the host and mixed into the same physical blocks in non-volatile memory system.

In non-volatile memory systems where blocks of data with differing characteristics are managed as a single population, write amplification issues may arise because certain types of data may be more likely to become obsolete at different rates than other types of data. The internal memory maintenance (i.e., non-host write operations or background operations such as noted above) can introduce a high write amplification factor ("WAF") for memory cells. WAF may be understood to be the relation between the amount of data a storage module has to write (including any internal copying of data from one block to another) to execute a host write operation to the actual amount of data that the host sends to be written to the storage module for the write operation.

DETAILED DESCRIPTION

Figure 1A:
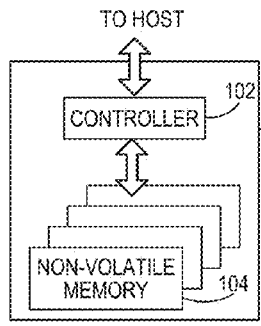
FIG. 1A is a block diagram of an example non-volatile memory system.

In order to permit a finer granularity of data management to reduce write amplification or assist in wear leveling, a method and system is described for managing data by identifying the epoch (time period) in which it is written from the host and keeping track of this information to subsequently manage data such that mixing of data first written from the host in different epochs rarely or never occurs. In addition, the method and system may include a similar optional framework for managing data according to a data classification (data type) decision. Data of different data types is also never or rarely mixed during subsequent space reclaim in one implementation.

According to one aspect, a method for managing data storage in a non-volatile memory system is disclosed. The method may include receiving data from a host at a controller of the non-volatile memory system, determining a data classification for the received data from a predetermined plurality of data classifications to assign the received data and writing the received data to an open data block having only data of a same data classification as the determined data classification. Upon completely programming the open data block, the method may also include associating an epoch indicator with the open data block and closing the block, where the epoch indicator defines a time period within which the block and a plurality of additional closed blocks were created.

According to another aspect of the disclosure, a method for managing data storage in a non-volatile memory system includes receiving data from a host at a controller of the non-volatile memory system, determining a data classification for the received data, and writing the received data to an open data block having only data of a same data classification as the determined data classification. The method further includes, upon completely programming the open data block, associating an epoch indicator with the open data block to create a closed block that is associated with the epoch identifier, where the epoch indicator defines a time period within which the closed block and a plurality of additional closed blocks were created. Finally the method may also include determining if the time period has expired and, when the time period has expired, changing the epoch indicator. The method continues with associating subsequent closed blocks with the changed epoch indicator until a next time period expires.

In another aspect, a non-volatile memory system is disclosed. The non-volatile memory system may include a non-volatile memory having a plurality of memory blocks, wherein all blocks containing valid data are exclusively associated with a respective one of a plurality of data types and one of a plurality of epoch indicators, and where each epoch indicator defines a different time period within which data in an associated plurality of blocks was received from a host. The system also includes a controller, in communication with the non-volatile memory, that is configured to detect a block reclaim trigger, select a previously programmed block as a source block in response to the detected trigger, and relocate valid data from the selected source block only to a relocation block exclusively associated with a same data type and a same epoch indicator as associated with the selected source block.

In yet another aspect, a non-volatile memory system may include a non-volatile memory having a plurality of memory blocks and a controller in communication with the non-volatile memory. The controller may be configured to receive data from a host and determine a data classification for the received data from a predetermined plurality of data classifications. The controller may also be configured to write the received data to an open data block having only data of a same data classification as the determined data classification, and, upon completely programming the open data block, store an association of an epoch indicator with the open data block in a data structure in the non-volatile memory system to create a closed block, the epoch indicator defining a time period within which the closed block and a plurality of additional closed blocks are created. The controller may further be configured to, upon detecting a block reclaim trigger, select a previously programmed block as a source block and relocate valid data from the selected source block only to a relocation block exclusively associated with a same data type and a same epoch indicator as associated with the selected source block.

In various alternative implementations, the above features may also be combined with a controller configured to support a different number of epochs for each different data type such that a previously assigned data type may be recharacterized to a different data type when a pool of data ages up to the maximum number of epochs supported for the originally assigned data type.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
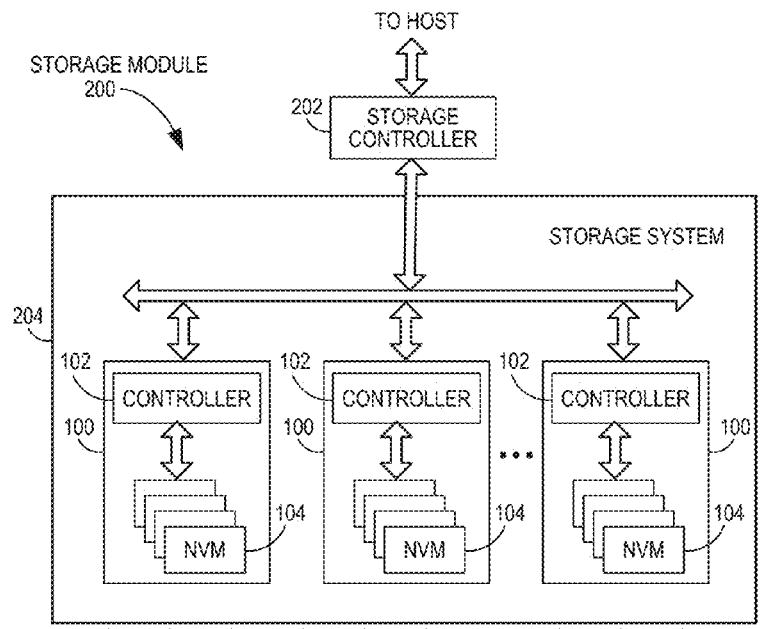
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
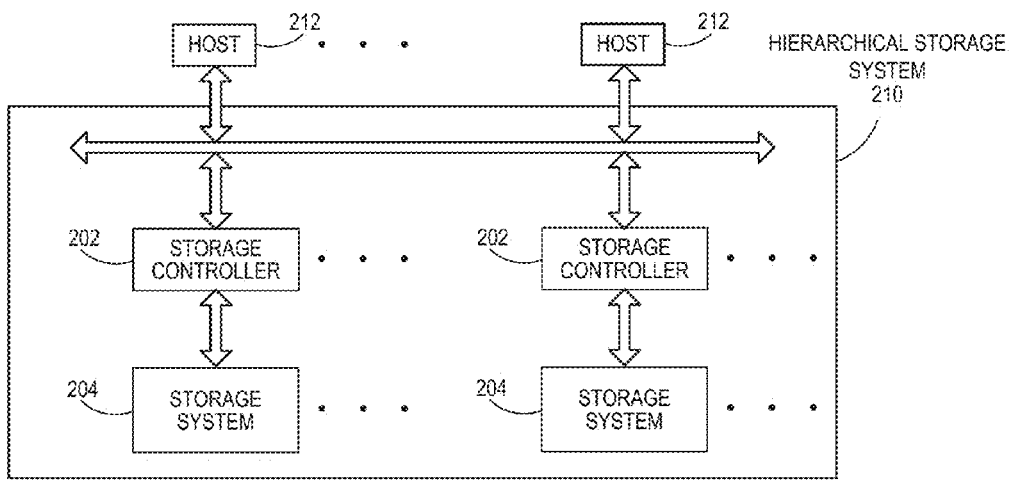
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
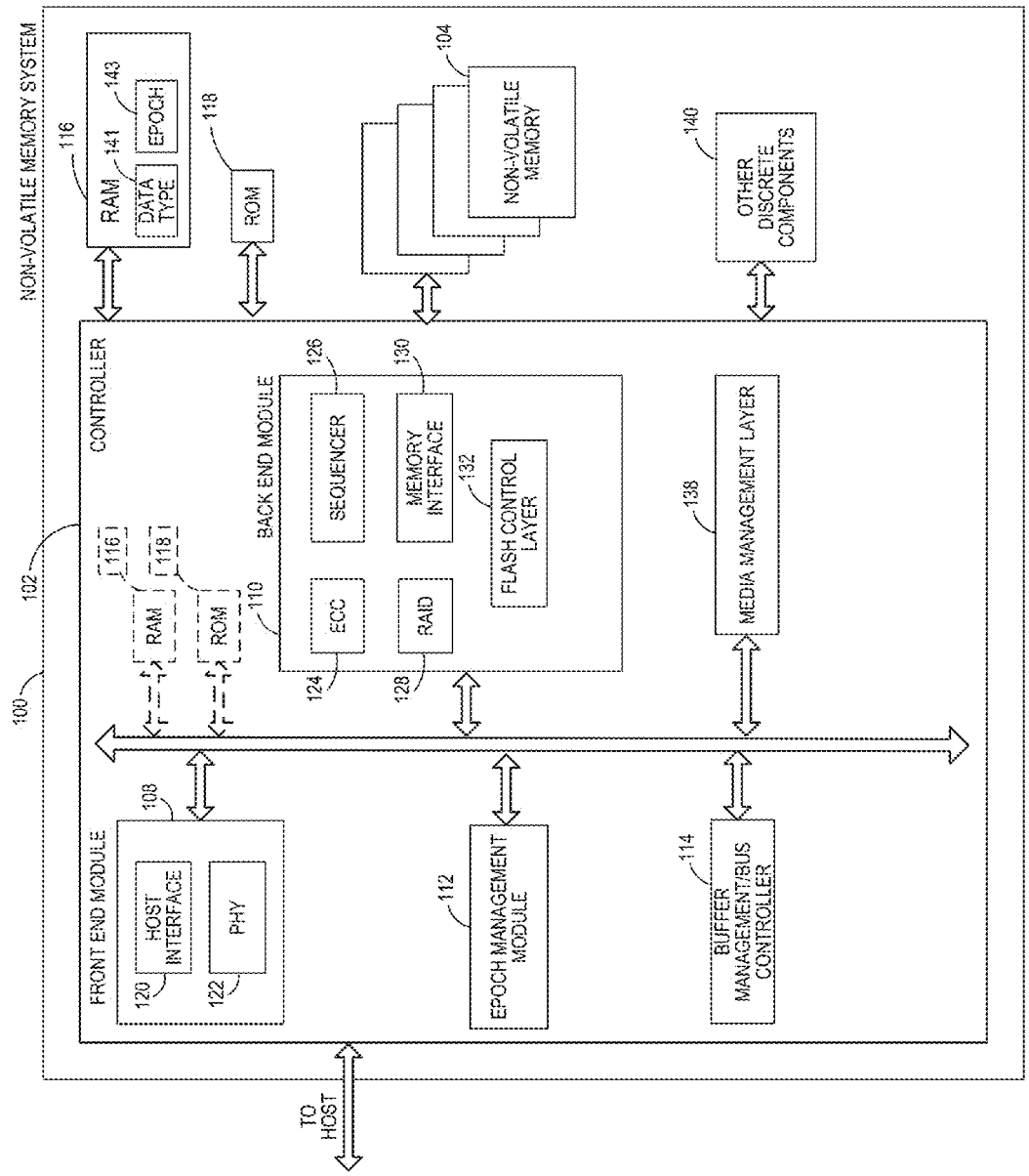
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include an epoch management module 112 present on the die of the controller 102. As explained in more detail below in conjunction with FIGS. 5-8, the epoch management module 112 may track and record both the data type and the age or epoch of data received at the NVM system 100. The epoch management module may first identify the type of data that has been received, for example cold data that is unlikely to be updated or overwritten and hot data that is more likely to be updated or overwritten. Other data types, and more than two different data types, may also be identified and tracked. Additionally, the relative age of the received data, regardless of data type, may be tracked by the epoch management module. As described in greater detail below, the age or epoch of data may be a course granularity tracking of data by the time period in which it is received, such that in addition to recording the data type, the epoch management module tracks the additional parameter of age for groups of data. The data type and age information may then be used by the epoch management module to select blocks of data for wear leveling and to manage garbage collection.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. As described below, the wear leveling process may be impacted by the epoch data that is recorded and tracked for data such that the greater accuracy of the frequency of update (also referred to herein in terms of a temperature where data that is infrequently updated is considered "cold" data and frequently updated data is considered "hot" data) available with the epoch tracking may be used to identify which data to move to physical blocks that have experienced a greater than average wear. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
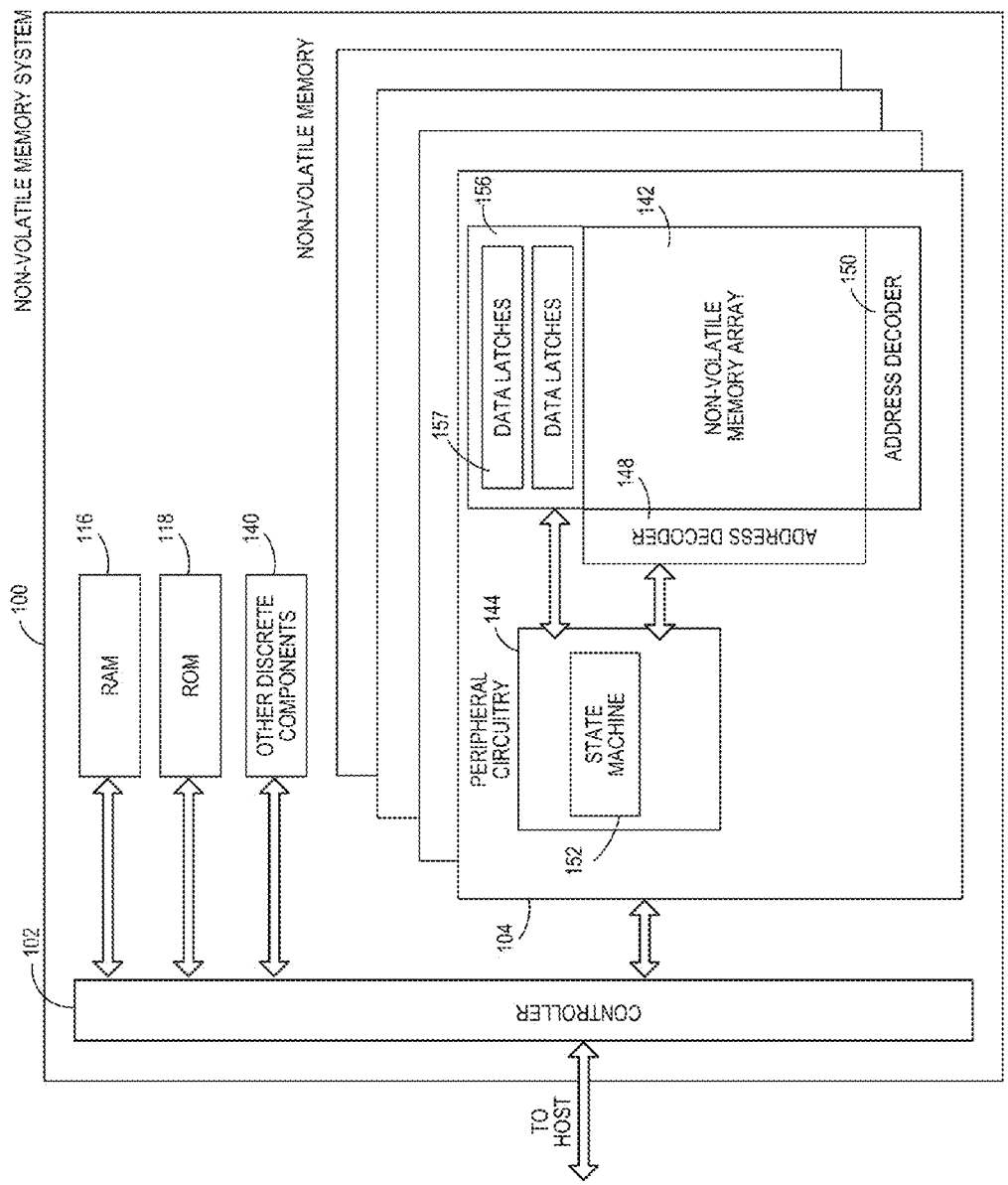
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 144 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 144 includes a state machine 152 that provides status information to controller 102. Non-volatile memory die 104 further includes a data cache 156 that caches data.

Figure 3:
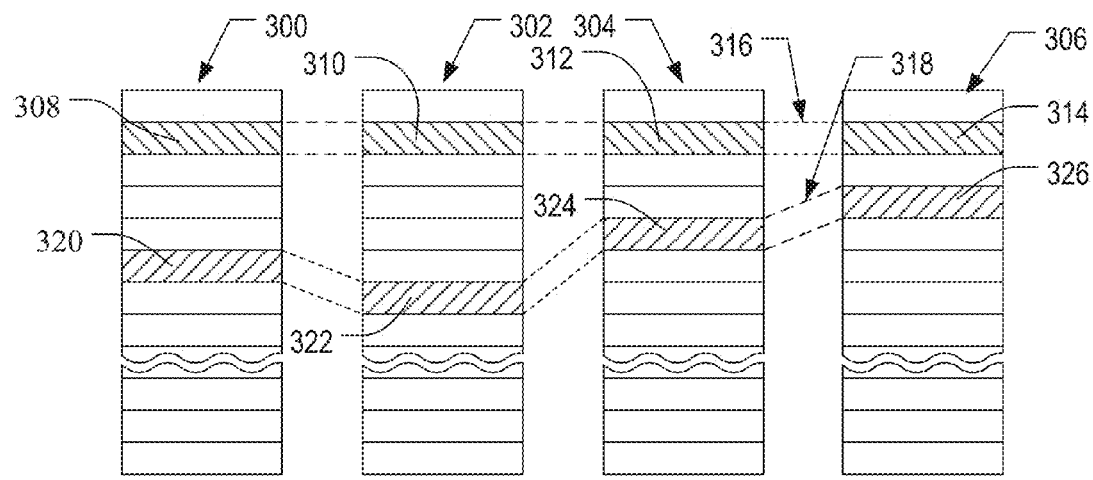
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
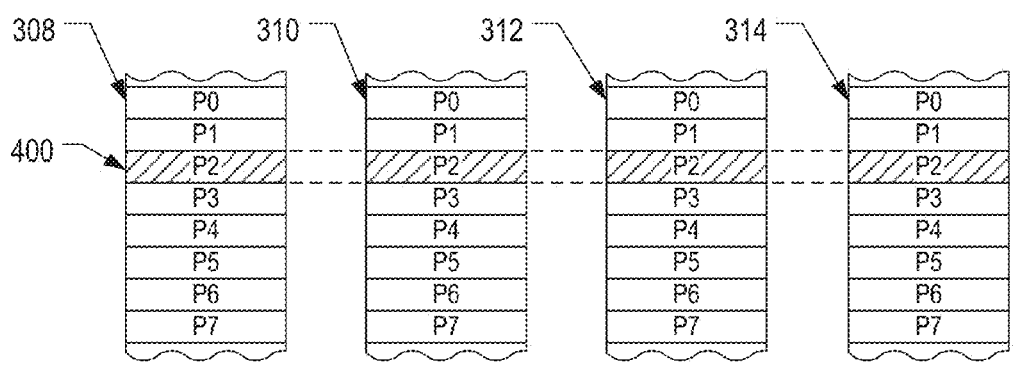
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
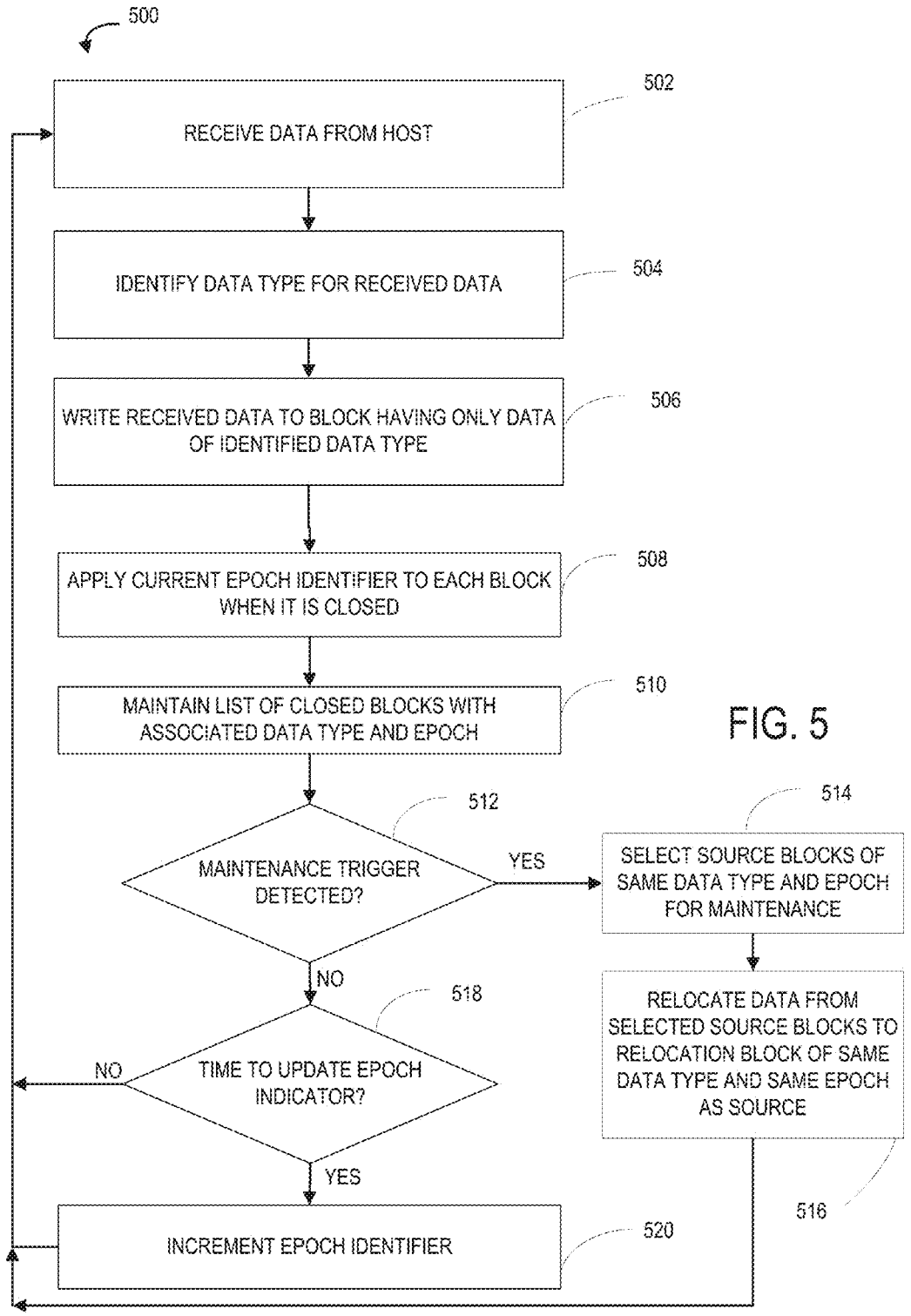
FIG. 5 is a flow diagram illustrating a method of applying and updating epoch identifiers to blocks in the non-volatile memory system of FIG. 1A.

Referring to FIG. 5, one implementation of a method for utilizing the epoch management module 112 to track and manipulate data in the NVM system 100 is illustrated. When the NVM system receives data from a host (at 502), the epoch management module 112 may identify the data type of the received data (at 504). The epoch management module 112 of the controller 102 may then direct the received data to be written into the non-volatile memory 104 into blocks only containing data of the same data type as the identified data type (at 506).

When a block in the non-volatile memory 104 is completely programmed with received data of a single identified data type, the epoch management module may then associate that block with an epoch identifier in addition to the data type (at 508). The epoch indicator may be an alphanumeric character, a string, or any of a number of types of indicators or values. The epoch identifier, in one implementation, may only be associated with a block at the time the block is completely programmed, also referred to as closed. In other implementations, the epoch indicator may be associated with each block when data is first written to the block, or at any point between the initial write to the open block and closing the block.

The epoch indicator may identify a range of time in which a block is closed such that all blocks closed within a particular period of time will be associated with the same epoch identifier. The period of time may be a fixed period of elapsed time, or it may instead be a variable period of time that is instead based on some other event, such as a predetermined amount of received host data being written independent of the elapsed time. One example of epochs based on a fixed period of time may be a different epoch identifier being applied to closed blocks for each day. One example of epochs having variable periods of time may be a different epoch identifier being applied to each 10 megabytes of data received and written, regardless of how long it takes for a particular 10 megabytes of data to be received. In yet other embodiments, the epoch indicator may be incremented based on multiple time or other criteria. As one example of a mixed criteria epoch, blocks of data being closed may be assigned a same epoch indicator until an earlier of an elapsed time or a particular amount of closed blocks of data have been reached. These examples are provided simply by way of example and other criteria, criteria thresholds or combinations of criteria are contemplated. While in some embodiments, the elapsed time used for each epoch may be identical, in other embodiments the elapsed time may vary from epoch to epoch by a fixed or variable amount.

Referring again to FIG. 5, the data type and epoch indicator information may be used to fine tune the process of maintenance operations in the NVM system 100 and wear leveling. When a maintenance operation trigger is identified (at 512) by the controller 102, the epoch management module 112 may select a source block from the closed blocks in non-volatile memory 104 based on the data type and epoch indicator information associated with the closed blocks (at 514).

In one implementation, the maintenance operation may be a garbage collection operation, also referred to as a data relocation operation, where valid data is copied from fully programmed source blocks and the source blocks (also referred to as closed blocks) are then erased to free up additional space for more data. The trigger for the operation may be that a number of free blocks (e.g. blocks that are unwritten and available for writing new data) detected by the controller 102 has fallen below a predetermined threshold. Although many variations of selection processes are contemplated, using the epoch indicator information the epoch management module 112 may select as a source block for a maintenance operation a closed block from the oldest epoch for a particular data type. After selecting the source block for the maintenance operation, the epoch management module 112 may then relocate valid data from the selected source block to a new or open relocation block that is assigned to receive only data of the same data type and epoch as was associated with the source block (at 516).

Rather than looking at an erase count of a block and assuming the lowest erase count correlates to the coldest data, or using a least recently written block algorithm to select cold data for writing into a worn block, where the data in the least recently written block is assumed to have the coldest data, the selection of the source block for wear leveling may be made by the controller 102 using the epoch data to determine the coldest data. The program/erase cycle history of the block may not be as closely correlated to the coldness of the data in that block as the epoch indicator, and thus the selection of a closed block with cold data may be improved by using the epoch indicator information which persists and travels with the data to select the block in the oldest epoch with the lowest program erase cycle count, rather than relying only on program and erase cycles of the block holding the data to determine what data is cold. Also, the epoch tracking methods described herein allow tracking when data was written from the host, unlike a typical least recently written block algorithm which would not be able to distinguish between host writes and relocation writes (e.g., from compaction).

Alternatively, if no maintenance operation trigger has been detected (at 512), the epoch management module 112 may then determine if it is time to update the epoch identifier that will be associated with subsequently closed blocks of received host data (at 518). As noted above, the epoch identifier refers to the "epoch" or relative age of groups of data. The epoch may refer to period of time in which data has been received, such that all of the data that is received at the NVM system 100 during a particular span of time may be identified as the same epoch or age. In determining whether it is time to update the epoch indicator, the epoch management module 112 may increment a counter to a next value, or save a current time value, and apply that value to all subsequent closed blocks of received data until a next epoch indicator update is required (at 520).

As noted previously, the epoch indicator may be updated if, for embodiments where each epoch represents an amount of received data (for example, each 100 Megabytes of received data), the next predetermined increment of data has been received. For embodiments where the epoch indicator relates to increments of elapsed time (for example, all data received and written into blocks that are closed within a predetermined span of time), the epoch indicator may be updated based on the passage of predetermined amounts of time. The update of the epoch indicator may be simply the incrementing by one increment a counter, or it may be the replacement of a prior time stamp with a new time stamp that is associated with all subsequently created closed blocks until a next epoch indicator increment. Other epoch indicator update mechanisms are also contemplated.

One aspect of the epoch tracking used by the epoch management module 112 of the controller 102 is that the epoch information for received data may be maintained during subsequent maintenance operations, such as garbage collection. In one implementation, data of a particular data type and epoch may only be relocated to another block exclusively designated for that data of that data type and epoch when a garbage collection operation is initiated. When the epoch management module 112 associates an epoch indicator with a block of data, that indicator and a block identifier may be stored in memory, such as RAM 116 and/or non-volatile memory 104. The epoch indicator and block identifier may be stored in memory in any of a number of data structures, such as a table or list. The data type information determined by the controller 102 and associated with each block may be stored in the same or different data structure as the epoch identifier associations. Referring again to FIG. 2A, an example of data type table 141 and an epoch indicator table 143, each storing data type or epoch and associated block data as determined or assigned by the epoch management module 112, is shown in the RAM 116 that may be inside or outside of the controller 102. A combined data structure, or other locations in the NVM system, for the data structure(s) 141, 143 are also contemplated. In other implementations, the information about epoch or data type of the data in a block may also, or alternatively, be stored in header information within the block itself.

The initial step of determining the data type of data received at the NVM system 100 (referring again to FIG. 5, at steps 502 and 504) may be accomplished in a number of different ways. The classification of the data type may account for external characteristics such as LBA pattern (for example, stream detection), host command length, a host hint that provides data type information for the data being sent, and/or (for data being relocated in a maintenance operation) information about the previous location of the data. The host or the NVM system 100 may identify and use the file-type extension or suffix (for example .tmp, .pdf, .xls, .exe and so on) associated with data to classify the data type in one implementation. The previous location may be the block in which the data was previously written, and the information about epoch and class for that prior block. This previous block information may thus provide information as to how that data ended up being classified the previous time it was written, which may be referenced as a good indication of the way the data should be handled for the new write.

Although any of a number of NVM systems and interfaces may be used with the system and method described herein, in one implementation the NVM system 100 may be a solid state drive (SSD) communicating with a host via a peripheral component interconnect express (PCIe) bus utilizing a non-volatile memory express (NVMe) protocol. In one implementation, the newly received host data (and their LBAs) may be associated with NVMe DataSet Management attributes. These attributes provide host hints which can be used by the epoch management module 112 or other function in the controller 102 of the NVM system 100 to initially classify the received host data. The DataSet Management hints may be used as a standardized mechanism for the host to provide additional information about data being written the NVM system 100 via the NVMe protocol. These hints provide attributes about the data being written which could be used to more appropriately assign an initial data classification and therefore to which pool the newly incoming data should be assigned.

The NVMe protocol defines attributes that include information about data such as whether the data is to be read/write sequentially, whether a region is to be written soon (write prepare), desired access latency, and data access frequency. If the data types recognized by the NVM system 100 are assumed to be based on the access frequency of data in one implementation, then these attributes for access frequency as defined by the NVMe standard may be used as host hints in the data type determination made by the controller 102. As seen in Table 1, an example of attributes of access frequency available in the NVMe specification are shown that may be associated with data by a host with a modified NVMe driver in a host. Table 1 illustrates a NVMe attribute identifier (ID), the associated message value and associated description of the type of data access that the identifier represents.

TABLE 1

| ID | Value | Description |
|---|---|---|
| 0 | 0000b | No frequency information provided. |
| 1 | 0001b | Typical number of reads and writes expected for this LBA range. |
| 2 | 0010b | Infrequent writes and infrequent reads to the LBA range indicated |
| 3 | 0011b | Infrequent writes and frequent reads to the LBA range indicated. |
| 4 | 0100b | Frequent writes and infrequent reads to the LBA range indicated. |
| 5 | 0101b | Frequent writes and frequent reads to the LBA range indicated |

One example of how the controller 102 may map the access frequency attribute information of Table 1 to a data type classification is shown in Table 2. The mapping of Table 2 assumes a system using three data type designations: long lived, short lived and very short lived data, where the data falling into the very short lived data type classification has been predetermined to have a higher likelihood of being rewritten or updates than the short lived data type, and the short lived data type has a higher likelihood of being overwritten than data associated with the long lived data type. The NVMe attribute IDs of 0, 1 and 4 may be predetermined by the controller 102 to be associated with short lived data likely representing data for files where the data is generic user data or recently written data. The NVMe attribute IDs of 2 and 3 may be predetermined to be long lived data types for infrequently accessed data such as system and executable files or media files. A third predetermined data type, "very short lived" may be predetermined to be NVMe attribute "5" data associated with certain types of recently written user data files that have a high likelihood of being rewritten or updated. This three data type example of Table 2 is one of many alternative data type classifications that are contemplated. The mapping of greater or fewer numbers of data types relating to predicted update frequency, data types relating to other than update frequency, or some other combination of data attribute to data type mapping is also contemplated in other implementations.

TABLE 2

| NVMe Attribute ID | Type of File |
|---|---|
| 0 (short lived) | Generic user data with no additional information |
| 1 (short lived) | Generic user data with no additional information |
| 2 (long lived) | System Files and executables which are not accessed frequently. This may be known during installation of a new program, where some files (like language files), are likely not to be used given the currently select language (as an example). |
| 3 (long lived) | Executables, Media files (photos, music, videos). |
| 4 (short lived) | User data files currently being written (WORD, PowerPoint, Excel) |
| 5 (super-hot) | User data files currently being written (WORD, PowerPoint, Excel) |

Figure 6:
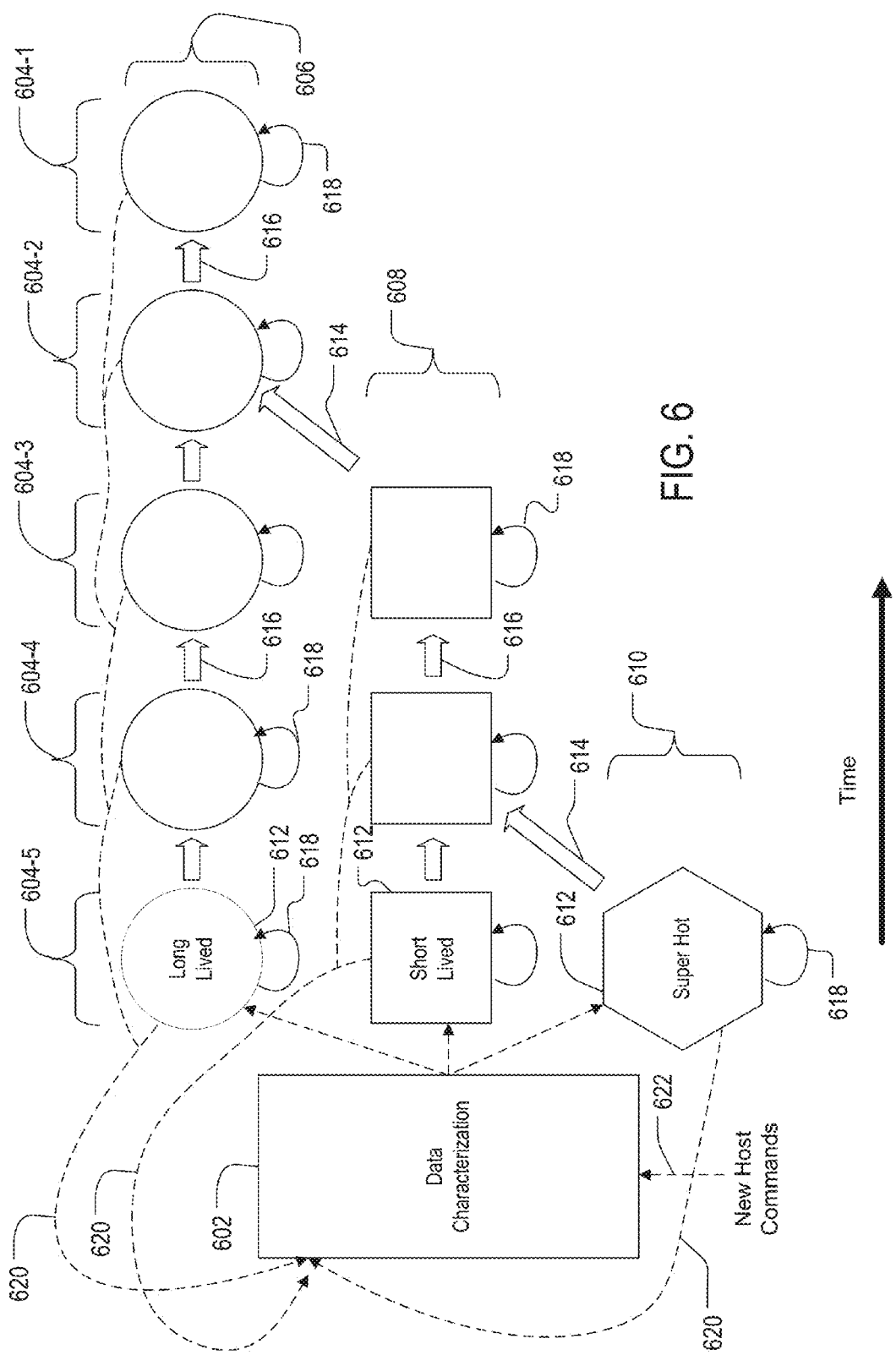
FIG. 6 illustrates an arrangement of data by data type and epoch suitable for use in the system of FIG. 1A.

FIG. 6 illustrates an implementation of epoch and data type tracking for a NVM system 100 utilizing the three data type example of Tables 1 and 2. The epoch management module 112 of the controller may perform data characterization 602 to sort incoming data or data being relocated as part of a maintenance operation according to data type and then assign the data to a long lived, short lived or very short lived (sometimes referred to herein as "Super-Hot") data type 606, 608, 610 in a particular epoch (604-1 to 604-5). In the example of FIG. 6, the earliest epoch containing the oldest data is represented as epoch 604-1 on the far right of FIG. 6 and the newest epoch 604-5 is illustrated on the left side where the most recently received data in the new host commands is first assigned. Each epoch may have data pools 612 of one or more data type, where each data pool 612 is all blocks of a particular data type associated with a particular epoch.

In the example of FIG. 6, the NVM system 100 only supports a limited number of epochs and, due the nature of the example data types being related to likelihood of being rewritten or updated, the "hotter" data types are associated with fewer epochs than the "colder" data types. Thus, in this example, the very short lived data type 610 ("Super-Hot" in FIG. 6) the hottest data based on the original data characterization 602 by the epoch management module 112 or other aspect of the controller 102) is only present in the most recent epoch 604-5, the short lived data type 608 (which may also be referred to as warm data) is present in the three most recent epochs 604-5, 604-3 and 604-4, and the long lived data type 606 (the coldest data) is present in all five of the epochs 604-1 to 604-5 supported in this example. The data originally designated as very short lived data 610, based on the host hint of the NVMe attribute ID predetermined (Table 2) to represent very short lived data by the epoch management module 112, is no longer considered very short lived if it persists for more than a full epoch, and thus the data type designation is changed from very short lived to the next lower update frequency data type, short lived 608, upon the next epoch identifier increment. Similarly, data associated with the short lived data type 608 is associated with the long lived data type 606 after 3 full epoch transitions in this example.

Data type re-characterization steps are illustrated by arrows 614 in FIG. 6, while the aging of data pools 612 of whatever data type to the next older epoch 604-4 through 604-1 is illustrated by horizontal arrows 616. The aging 616 of a data pool 612 may simply be the increment of an epoch indicator by the epoch management module 112 in the controller 102 such that the previous epoch indicator already associated with a particular pool of data 612 represents an older epoch than the data pools receiving a more recent epoch indicator. Implicitly, all blocks attributed to former epochs shift to the right in the diagram at the same time when an epoch indicator is incremented. At this stage it is possible to merge data types if for example the classification is not expected to have a significant data content at that epoch (e.g. short-lived data would not be expected to last to the last epoch, here epoch 604-1). This would indicate incorrect classification, which would feedback implicitly to subsequent data type classification decisions. That is, as the epoch indicator, which may be a counter, is increased over time, each data type classification could be re-analyzed to determine if something that was identified as super-hot has now outlived that initial determination. For example, if the epoch management module determines that the epoch count is too great for a super-hot data type and therefore, should be reclassified as a short lived data type. An epoch indicator associated with data at the data characterization stage 602 remains with the data blocks in a data pool 612 in one implementation. FIG. 6 also includes a representation of prior data location information 620 and host data type hint information 622 that the data characterization module 602 may use to decide which data type 606, 608, 610 and epoch 604-1 to 604-5 to assign to data.

Also illustrated in FIG. 6 is the concept of block reclaim and the persistence of the epoch and data type tracking through block reclaim. The maintenance operation of block reclaim, sometimes also referred to as garbage collection, is show in FIG. 6 by arrows 618. Any block reclaim operation 618, in one embodiment, always relocates the data from the selected source block into an open block that has been assigned by the epoch management module 112 to only receive relocated data associated with the same data type and same epoch indicator. The epoch indicator and data type assigned to that relocation block will thus be the original epoch indicator and the data type of the source blocks from which data is relocated. Unlike new host data received and written to open blocks as described previously, where the epoch management module 112 assigns the most recently incremented epoch indicator at the time a block is closed, for a relocation block the epoch indicator and data type already associated with the source blocks is again associated with the relocation block. This is reflected in FIG. 6 by the arrow 618, representing how the reclaim process leaves the relocated data with the same epoch indicator and data type, and thus in the same pool 612 of blocks. As will be understood, a reclaim process may occur in only one pool 612 or in multiple pools 612 at any given time and the arrows 618 simply show how data would flow in a reclaim process that is active, and not that all pools 612 would be required to be involved in active block reclaim operations at a same time.

Figure 7:
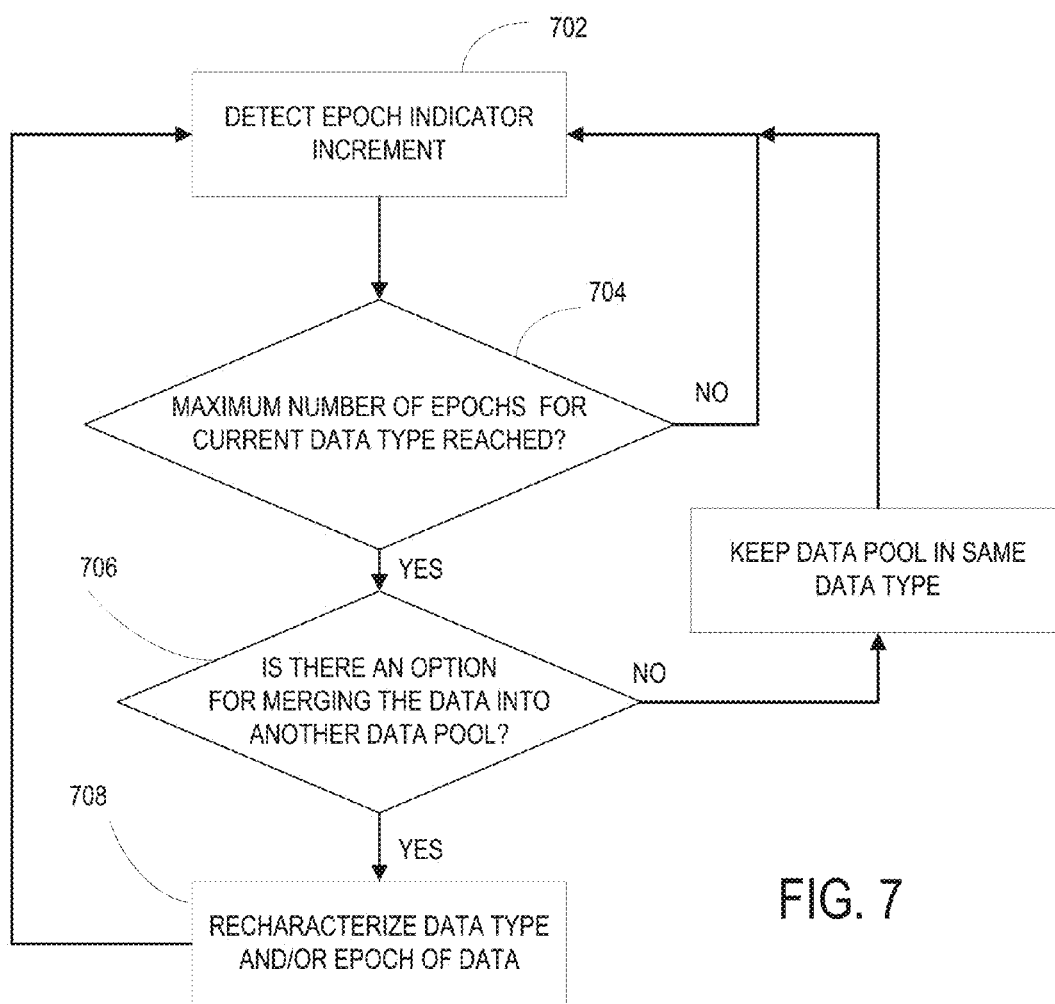
FIG. 7 is a flow diagram illustrating a method of recharacterizing data of an originally assigned data type to a pool of data associated with a different data type.

Referring to FIG. 7, the epoch management module 112 may increment an epoch indicator when predetermined criteria are met, such as the passage of a predetermined amount of time or the receipt of a predetermined amount of data as discussed above, thus aging existing data pools 612 by the generation of new epoch identifiers for more recently received host data. When an epoch identifier is incremented for association with subsequently received data, the epoch management module may check to see if the oldest epoch data pool for a particular data type is already at the maximum number of epochs for the data type (at 702, 704). If not, the data pool 612 stays associated with the same data type, but if the data pool was already in the last supported epoch for that data type, the epoch management module 112 may then check to see if there is an option available for merging the data into another data pool with a different epoch and/or data type (at 706). The option may be implemented in the form of a rule or threshold maintained in a memory within the controller 102 or NVM system 100. The controller 102 may, in one implementation, retrieve a rule to see if there is another data type with a greater number of epochs available. For example, the rule may be to look to see if there exists a next lower frequency data type with a greater number of supported epochs. In this implementation, if a next lower frequency data type exists, then the pool of data under consideration may be assigned to the new data type and/or epoch indicator.

If there is the option of merging the data into a different data pool, then the data type and/or epoch indicator of the data may be recharacterized accordingly (at 708). For example, in implementations where there is a next lower frequency update data type recognized in the NVM system 100, then the controller 102, via the epoch management module 112, may re-characterize the data type for all data in the data pool 612 being analyzed such that the blocks of data in that pool are now associated with the next lower update frequency data type. Alternatively, if there is no next lower update frequency data type (for instance, if the data type is the long lived data type in the example of FIG. 6), then the data type remains the same and the oldest epoch is extended to encompass all of the epochs that are the greater than the predetermined number that are being tracked. In one implementation, the NVM system 100 only allows a finite number of epochs. When data within a block of a pool 612 that has reached the last supported epoch, it remains there until overwritten by the host, though the physical block in which the data resides may change many times if the data is moved as part of a maintenance operation.

There are different methods for associating epoch numbers with data. Either the epoch number initially assigned to a block of data stays fixed until the block reaches the final epoch where the epoch number is adjusted at each epoch changeover (since the oldest epoch is lost), or the first epoch may always be allocated a set number (e.g. zero) and then at each epoch changeover (increment) all block epochs are incremented except those that belong to the oldest epoch. The particular desired epoch number incrementing schemes noted above may be implemented at step 520 of FIG. 5 in one embodiment.

Figure 8:
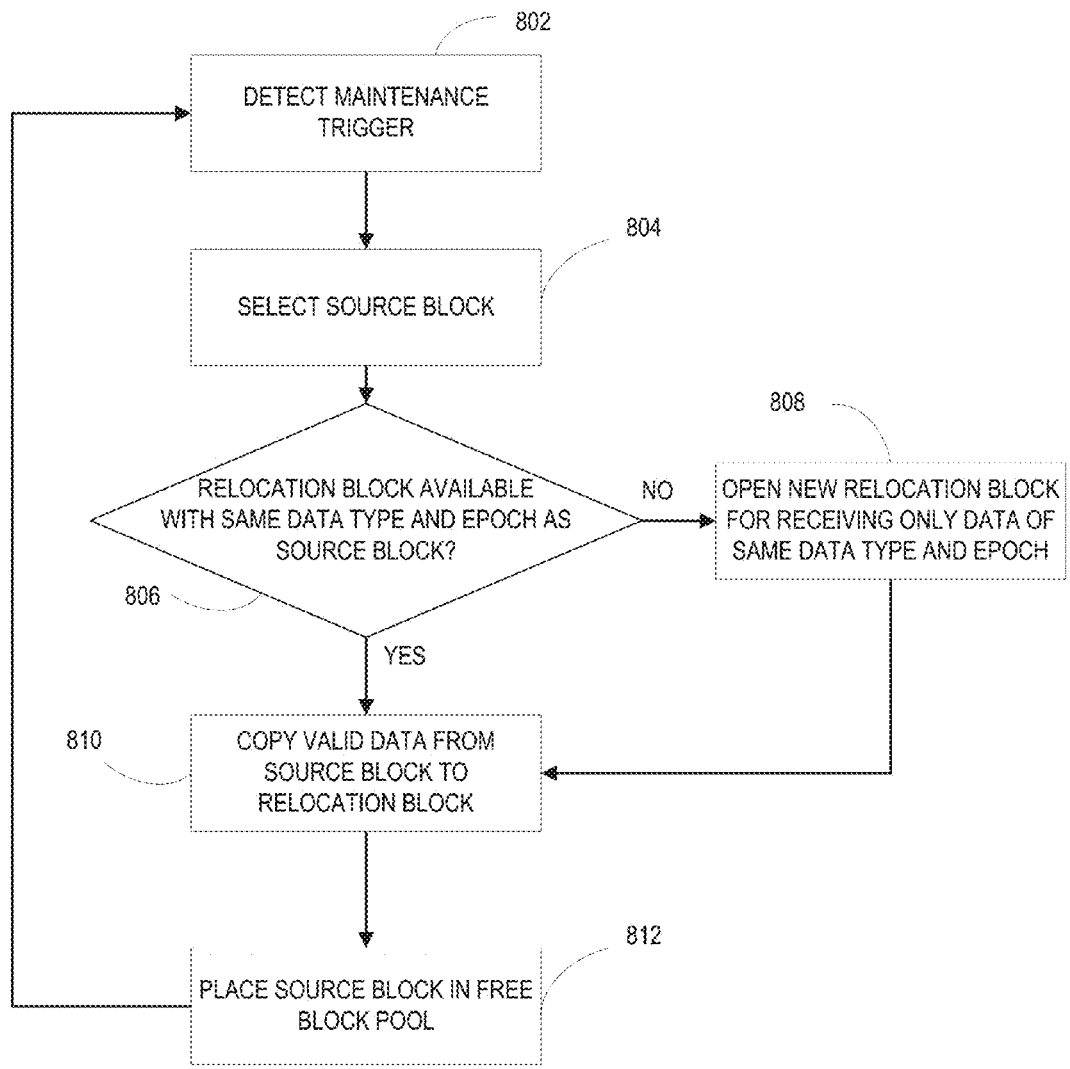
FIG. 8 is a flow diagram showing a method for performing a maintenance operation in a non-volatile memory system utilizing a data arrangement such as shown in FIG. 6.

Referring now to FIG. 8, an example of executing a reclaim process in NVM system having an epoch and data type structure such as shown in FIG. 6 is described. When a block reclaim trigger is detected by the controller 102 (at 802), the controller 102 may select a source block from which to relocate valid data into an open block (at 804). The source block may be a closed block, also referred to as a fully programmed block, containing an amount of valid and obsolete data. Once the source block is selected, a different block to which the valid data from the source block is to be moved is selected. The relocation block is selected based on the data type and the epoch indicator associated with the source block. In one implementation, if there is an open relocation block having the same data type and epoch indicator associated with it as the selected source block, then the valid data is copied from the source block to that relocation block (at 806, 810). If no open relocation blocks are available associated with the same data type and epoch indicator as the selected source block, then a new relocation block is opened and associated with the data type and epoch indicator of the source block (at 808). The valid data may then be copied to that newly opened source block (at 810). Once all the valid data is copied from the source block to an appropriate relocation block, the source block may be placed in the free block pool for later use in writing new host data or relocated data. The source block may be erased as soon as it is placed in the free block pool, or placed in the free block pool but only erased when it is next needed. The process of FIG. 8 illustrates that relocated data is only relocated to blocks exclusively associated with data of a same data type and epoch indicator as the source block(s) from which data is copied. Thus, as shown in FIG. 6 by arrows 618, data may always stay in blocks in the same pool 612 of blocks using the method of FIG. 8.

In other embodiments, it is also possible to break the strict interpretation of epoch, and only allow blocks to progress (to the right in the diagram of FIG. 6) that have not been recently written. This can be advantageous as it may inhibit newly relocated data (for example relocated during a reclaim operation as noted above) to be held back until data overwrite within the block reduces. Such a scheme might also involve assigning an epoch 'tick' attribute that flips at each change in epoch. Only data blocks with older tick values are allowed to progress. In alternative embodiments certain blocks may be permitted to 'jump' epochs and skip one or more intervening epochs. If certain blocks in a pool 612 exhibit a feature or behavior to indicate it would be better to accelerate the block through the epochs outside the typical lockstep epoch transition timing, then the controller 102 may simply change the epoch transition timing, or skip one or more epochs, for that block or pool 612. For example, if there is a data type where it may be advantageous to monitor finer granularity epochs, but there are other data types where such detail is not required, then an epoch skipping method can be used for the coarser granularity data types to reduce the overall number of epochs.

The division of all closed blocks into pools 612 by data type and epoch allows data with similar predicted 'lifetimes' (future overwrite time) to be managed together. This may reduce write amplification in typical NVM system workloads where remaining lifetime is correlated to data classification and current life. The segregation and persistent tracking of both data type and epoch in managing data movement is also useful for wear-levelling functions as it provides a good indication of data that should and should not be used to fill heavily worn blocks. For example, as noted above, the accuracy of selecting the coldest data for filling heavily worn blocks may be improved by using the epoch tracking data that is maintained to select a source block with data in the oldest epoch for a wear leveling operation which may be combined with, or separate from, a garbage collection operation. This use of the epoch data to select the coldest data for a wear leveling operation that will write that cold data into a worn block (one that has experienced a relatively high number of program and erase cycles, for example) may also be combined with other typical source block selection techniques, where not only is data from a block in the earliest (oldest) epoch selected, but data from the block with the least number of program and erase cycles in the oldest epoch may be selected in one implementation.

In one implementation, the epoch indicator data that is assigned to data in each data pool 612 and stored in a table 143 may be utilized in combination with a weighting function to modify a typical reclaim (garbage collection) operation and the associated source block selection process. For example, when selecting a source block for a garbage collection operation, the block with the least amount of valid data is typically selected as the source block so that the amount of data that needs to be moved to a new block from the source block is minimized. However, this simplistic source block selection mechanism may tend to favor selecting a block from the hottest data type (e.g. blocks having data of the super-hot data type 610) where it is expected that the data is likely to be made obsolete quickly. In the long term it may be desired to release smaller volumes of obsolete space in colder blocks because this may improve the available physical overprovisioning available for subsequent new hot data.

To avoid over-cycling blocks of data that contain hot data and thus improve the chances of selecting of blocks containing data of colder data types as source blocks, a weighting function may be applied by the controller 102 to the actual percentage of valid data contained into blocks of different data types. The weighting function may be any of a number of known functions that would work as a multiplier or addition to increase the perceived amount of valid data in blocks containing hotter data. In this manner, the percentage of valid of data in blocks with the hotter data types may be artificially increased so that, to be selected as a source block in a garbage collection operation, a block of a colder data type may contain more valid data than a block of a hotter data type and still be selected as a source block.

Figure 9:
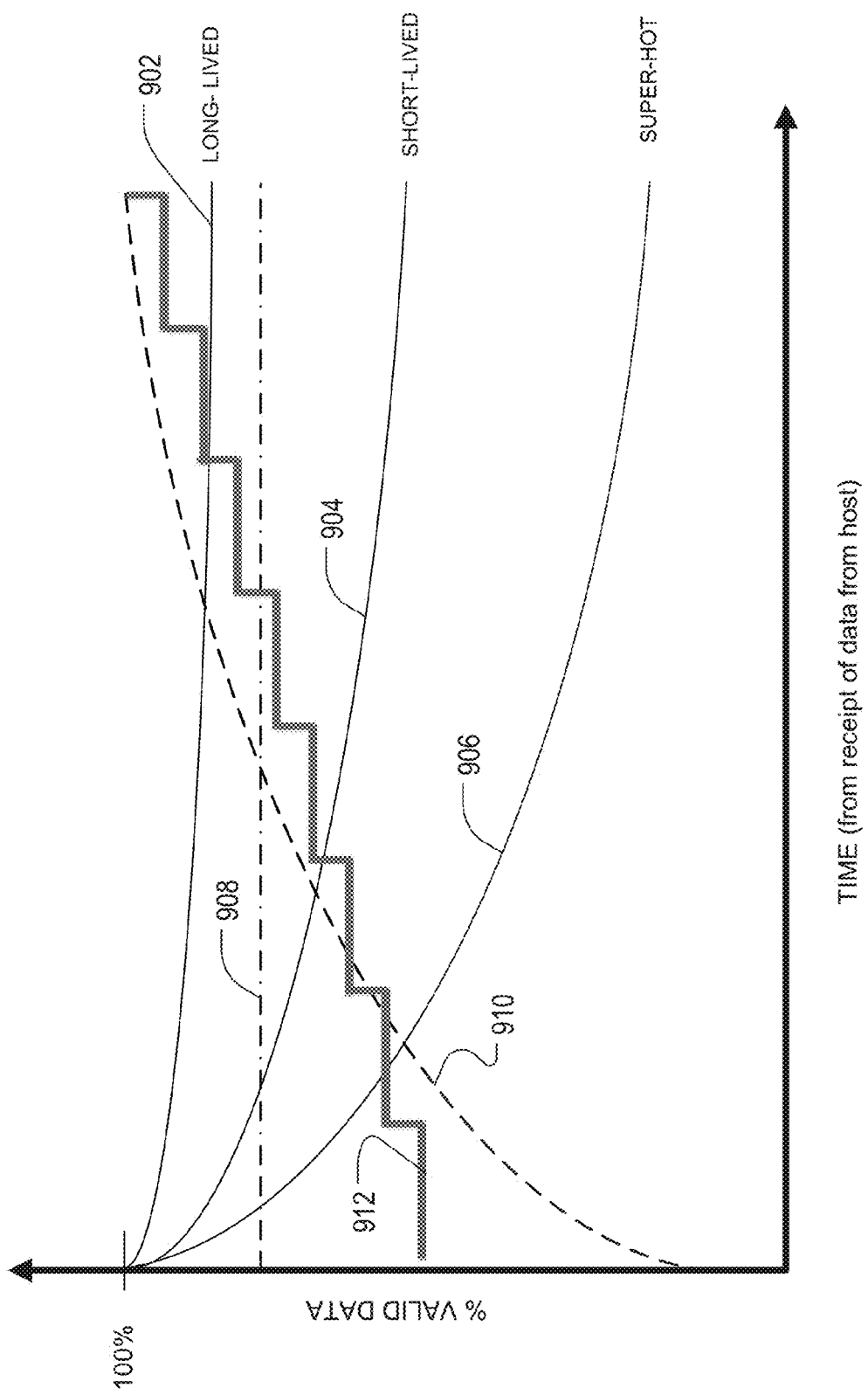
FIG. 9 illustrates different block selection thresholds usable in adjusting a weighting of blocks selected for a wear leveling or garbage collection operation.

An example of a weighting function and its relation to the selection of blocks for reclaim is illustrated in FIG. 9. Three hypothetical curves 902, 904, 906 conceptually illustrating the amount of valid data versus time that is expected in blocks associated with in long-lived, short-lived and super-hot data types, respectively (such as described in the example of FIG. 6) are shown. A typical block selection threshold 908 with no weighting is shown, representing a constant maximum percentage of valid data that is used for all blocks, regardless of data type, when selecting a block for a garbage collection or other recycling operation. As can be seen in this hypothetical example, it is less likely that blocks of long-lived data may have a percentage of valid data that crosses below the constant threshold 908, while short-lived and super-hot data type blocks are much more likely to be selected based on this threshold 908.

In one embodiment, a variable threshold 910 is illustrated that varies such that a greater amount of obsolete data (a lower percentage of valid data) is needed for selecting younger blocks and a higher percentage of valid data is suitable for older blocks to be selected. Thus the younger blocks are weighted such that they are selected only when they contain a much lower percentage of valid data as compared to older blocks that need a lesser percentage of valid data to be selected. In one implementation, a weighting algorithm in the form of a continuous function that produces the variable threshold 910 may be used to provide a multiplier that is used to multiply the percentage of valid data in hotter data blocks so that the chances of selecting a colder block for a garbage collection operation are increased. In another embodiment, a step-function approximation 912 of the desired variable threshold may be used in place of a continuous function variable threshold 910, where the values of the step-function approximation 912 may be predetermined and retrieved from memory when the controller searches for new source blocks for a garbage collection or other maintenance operation.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for managing data storage in a non-volatile memory system, the method comprising:
   receiving data at a controller of the non-volatile memory system;
   determining a data classification for the received data from a predetermined plurality of data classifications to assign the received data;
   writing the received data to an open data block having only data of a same data classification as the determined data classification;
   upon completely programming the open data block, associating an epoch indicator with the open data block and closing the open data block to form a closed block, the epoch indicator defining a time period within which the closed block and a plurality of additional closed blocks were created; and
   in response to detecting a block reclaim trigger in the non-volatile memory system:
      selecting a block from a pool of closed blocks each having a previously determined data classification and a previously associated epoch indicator; and
      moving valid data from the selected closed block to an open relocation block exclusively associated with a same data classification and a same epoch indicator as the selected closed block.

2. The method of claim 1, wherein selecting the block comprises selecting the block having a least amount of valid data.

3. The method of claim 1, wherein selecting the block comprises selecting the block from closed blocks associated with an earliest of a plurality of epochs.

4. The method of claim 1, wherein each of the predetermined plurality of data classifications comprises a different likelihood of the received data being overwritten.

5. The method of claim 4, wherein determining the data classification for the received data comprises receiving a data use frequency indicator from a host and associating one of the predetermined plurality of data classifications with the received data based on the data use frequency indicator.

6. The method of claim 4, wherein determining the data classification for the received data comprises identifying a data type suffix of the received data and associating the received data with the data classification predetermined as corresponding to the identified data type suffix.

7. A method for managing data storage in a non-volatile memory system, the method comprising:
receiving data at a controller of the non-volatile memory system;
determining a data classification for the received data from a predetermined plurality of data classifications to assign the received data;
writing the received data to an open data block having only data of a same data classification as the determined data classification;
upon completely programming the open data block, associating an epoch indicator with the open data block to create a closed block, the epoch indicator defining a time period within which the closed block and a plurality of additional closed blocks were created; and
determining if the time period has expired and, if the time period has expired, changing the epoch indicator; and
associating subsequent closed blocks with the changed epoch indicator until a next time period expires.

8. The method of claim 7, wherein each time period comprises a predetermined elapsed time.

9. The method of claim 8, wherein each time period comprises an identical amount of elapsed time.

10. The method of claim 7, wherein each time period is defined by an amount of data being received such that a time period expires only upon receiving a predetermined amount of data independent of any predetermined elapsed time.

11. The method of claim 7, wherein the epoch indicator comprises a counter and changing the epoch indicator comprises incrementing the counter.

12. The method of claim 7, further comprising:
in response to detecting a block reclaim trigger in the non-volatile memory system, the controller:
selecting a closed block from a pool of closed blocks having a same data classification and a same epoch indicator; and
moving valid data from the selected closed block to an open relocation block exclusively associated with the same data classification and the same epoch indicator.

13. A non-volatile memory system comprising:
a non-volatile memory having a plurality of memory blocks, wherein all blocks containing valid data are exclusively associated with a respective one of a plurality of data types and one of a plurality of epoch indicators, each epoch indicator defining a different time period within which data in an associated plurality of blocks was received from a host; and
a controller in communication with the non-volatile memory, the controller configured to:
detect a block reclaim trigger;
in response to detecting the block reclaim trigger, select a previously programmed block as a source block; and
relocate valid data from the selected source block only to a relocation block exclusively associated with a same data type and a same epoch indicator as associated with the selected source block.

14. A non-volatile memory system comprising:
a non-volatile memory having a plurality of memory blocks; and
a controller in communication with the non-volatile memory, the controller configured to:
receive data from a host;
determine a data classification for the received data from a predetermined plurality of data classifications to assign the received data;
write the received data to an open data block having only data of a same data classification as the determined data classification;
upon completely programming the open data block, store an association of an epoch indicator with the open data block in a data structure in the non-volatile memory system to create a closed block, the epoch indicator defining a time period within which the closed block and a plurality of additional closed blocks are created; and
upon detecting a block reclaim trigger:
select a previously programmed block as a source block; and
relocate valid data from the selected source block only to a relocation block exclusively associated with a same data type and a same epoch indicator as associated with the selected source block.

15. The non-volatile memory system of claim 14, wherein the controller is further configured to:
determine if the time period has expired and, if the time period has expired, change the epoch indicator; and
associate subsequently closed blocks with the changed epoch indicator until a next time period expires.

16. The non-volatile memory system of claim 14, wherein each time period comprises a predetermined elapsed time.

17. The non-volatile memory system of claim 16, wherein each time period comprises an identical amount of elapsed time.

18. The non-volatile memory system of claim 14, wherein each time period is defined by an amount of data being received such that the time period expires only upon receiving a predetermined amount of data independent of any predetermined elapsed time.

19. The non-volatile memory system of claim 15, wherein the epoch indicator comprises a counter and changing the epoch indicator comprises incrementing the counter.

* * * * *